(12) United States Patent
Castro et al.

(10) Patent No.: US 12,169,301 B2
(45) Date of Patent: *Dec. 17, 2024

(54) SMF TO MMF COUPLER

(71) Applicant: Panduit Corp., Tinley Park, IL (US)

(72) Inventors: Jose M. Castro, Naperville, IL (US);
Yu Huang, Orland Park, IL (US);
Bulent Kose, Burr Ridge, IL (US);
Richard J. Pimpinella, Prairieville, LA (US); Asher S. Novick, New York, NY (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,775

(22) Filed: Oct. 23, 2023

(65) Prior Publication Data

US 2024/0053533 A1 Feb. 15, 2024

Related U.S. Application Data

(63) Continuation of application No. 17/270,736, filed as application No. PCT/US2019/049496 on Sep. 4, 2019, now Pat. No. 11,835,754.

(60) Provisional application No. 62/726,636, filed on Sep. 4, 2018.

(51) Int. Cl.
*G02B 6/02* (2006.01)
*G02B 27/00* (2006.01)

(52) U.S. Cl.
CPC ..... *G02B 6/02328* (2013.01); *G02B 27/0012* (2013.01)

(58) Field of Classification Search
None
See application file for complete search history.

(56) References Cited

U.S. PATENT DOCUMENTS

| 8,995,038 B1* | 3/2015 | Anderson | G02B 26/02 359/227 |
|---|---|---|---|
| 10,845,268 B1 | 11/2020 | O'Sulivan | |
| 2006/0067632 A1 | 3/2006 | Broeng et al. | |
| 2012/0170889 A1* | 7/2012 | Kato | G02B 6/12 385/28 |

(Continued)

OTHER PUBLICATIONS

Dhawan Ravi, et al., "A low loss mechanical splice for gas sensing using Hollow-Core Photonic Crystal Fibre", Optik, Wissenschaftliche Verlag GMBH, DE, vol. 124, No. 18, (Feb. 6, 2013), pp. 3671-3673, XP028686939, ISSN: 0030-4026, DOI: 10.1016/J.IJLEO.2012.11.016, the whole document.

(Continued)

*Primary Examiner* — Chris H Chu
(74) *Attorney, Agent, or Firm* — Peter S. Lee; Christopher S. Clancy; James H. Williams (57) ABSTRACT

A patch cord for transmitting between a single mode fiber (SMF) and a multi-mode fiber (MMFs) has a MMF, SMF, and a photonic crystal fiber (PCF) with a hollow core placed between the SMF and MMF. A mode field diameter (MFD) of the PCF hollow core section is in the range of 16 to 19 microns, the length of the PCF is between 1 cm to 10 cm, the MMF has 50±2 microns core diameter, the SMF has a 6-9 microns core diameter, and the coupling between the PCF mode to the MMF fundamental mode is maximized.

6 Claims, 10 Drawing Sheets

(56) References Cited

U.S. PATENT DOCUMENTS

2012/0237164 A1\* 9/2012 Jasapara ............. G02B 6/0288
                                                    385/33
2015/0333830 A1   11/2015 Chen et al.
2018/0202843 A1\* 7/2018 Artuso ............... G01D 5/35361
2023/0194954 A1\* 6/2023 Brussaard ............ G02F 1/3528
                                                    385/122

OTHER PUBLICATIONS

Choi, S., et al., "Low loss mode converter based on adiabatically tapered hollow optical fibre", Electronics Letters, IEE Stevenage, GB, vol. 37, No. 13, 21, (Jun. 21, 2001), pp. 823-825, XP006016777, ISSN: 0013-5194, DOI: 10.1049/EL:20010563, the whole document.

Patrick Meras, Jr., et al., "Laser Frequency Stabilization for Coherent Lidar Applications Using Novel All-Fiber Gas Reference Cell Fabrication Technique", Jun. 23, 2008, 4 pages, XP093156986, Jet Propulsion Laboratory, Retrieved from the Internet: URL: https://citeseerx.ist.psu.edu/document?repid=rep1&type=pdf&doi=ac412982a970988dbed34eb1 c2f787fda784dafb.

\* cited by examiner

SMF TO MMF COUPLER

CROSS-REFERENCE TO RELATED APPLICATION(S)

This application is a continuation of U.S. Non-Provisional patent application Ser. No. 17/270,736, filed Feb. 23, 2021, which is a U.S. National Stage Application under 35 U.S.C. § 371 of International Application No. PCT/US2019/049496, filed Sep. 4, 2019 and published as WO 2020/086161 on Apr. 30, 2020, which claims benefit to U.S. Provisional Application No. 62/726,636, filed Sep. 4, 2018, the entirety of all of which are hereby incorporated by reference herein.

FIELD OF TECHNOLOGY

The present invention relates to the field of network optical interconnection and more specifically to apparatus and methods to facilitate transition from multimode fiber networks to single mode networks.

The apparatus and methods disclosed here provide optimized mode couple functionalities that enable transmission of signals from single mode transceivers over multimode fibers.

BACKGROUND

Intensity modulated and direct detection (IM-DD) transceivers using vertical cavity surface emitting lasers (VCSELs), operating in the spectral range of 850 nm to 950 nm, are widely deployed in enterprise data centers. Those transceivers, which operate over multimode fiber (MMF) channels, can currently support aggregated data rates up to 100 Gb/s (around 25 Gbps per lane).

As the demand for higher data rates continues to grow, the pursuit of cost effective and efficient methods to increase transmission capacity are actively underway. For VCSEL-MMF channels, transmission at aggregated data rates up to 800 Gb/s require the combination of several schemes, such as short wavelength division multiplexing (SWDM), spatial division multiplexing, (SDM) using parallel fiber optics, and pulse amplitude modulation (PAM). Utilization of VC SELs for higher data rates while maintaining useful reaches and low cost is challenging due to VCSEL bandwidth limitations, non-linear responses, laser mode dynamics, chromatic dispersion, and other effects.

On the other hand, IM-DD transceivers using single mode lasers, such as DFBs with relatively narrow linewidth, may face less difficulties to achieve higher transmission rates. Single mode transceivers are designed to operate over single mode fiber (SMF) using wavelengths over 1260 nm.

As any other asset, data center hardware ages over time and eventually need to be replaced. However, the replacing cycles for transceivers and media infrastructure are different, their schedules do not necessarily synchronize. In most cases, transceivers are changed at least two times more often than fiber infrastructure.

It is likely that in a mid-term or long-term future, data center using currently MMF links, will require data rates beyond the capabilities of the VCSEL transceiver technology and, therefore, will need to switch to SM transceivers. Since SM transceivers cannot operate over MMF deployed in data centers, maintaining reaches and reliable connections will require to change also the fiber and connectivity of the datacenter.

It will be highly desirable to have SM transceivers that operates in both MMF and SMF channels. However, this is not currently possible for reasons described below.

First, there is a mode mismatch between the SM transceiver (and SMF) mode to the fundamental mode of the MMF. Therefore, more than one mode is excited during coupling, and more are added along the channel due to multiple connections, fiber bending, patch cord vibrations, among other causes.

Second, the SM transceivers operate at much longer wavelengths, i.e. 1300 nm. Since the modal dispersion of deployed MMF has been optimized for a narrow spectral window around 850 nm (i.e. >4700 MHz-km), these fibers provide very low modal bandwidth at the SM transceiver operational wavelengths. Third, the receivers used in SM transceivers have a very small aperture relative to the MMF core diameter, increasing the losses of the channel.

Due to the reasons mentioned above, even small vibrations can be important sources of modal noise when trying to operate MMF with SM transceivers. Therefore, SM transceivers operating over MMF channels are subject to critical high modal dispersion (low modal bandwidth), increased noise, and increased attenuation.

A solution to minimize this large signal degradation is to optimize the coupling of the SM transceiver (or SMF) mode to the MMF fundamental mode. Several works towards that goal are described in the next section.

PRIOR ART EVALUATION

A way to overcome the limitations describe above is to use a non-standard fiber that is designed to optimize the coupling of the SM transceiver to the fundamental mode of the fiber as shown in patent application for Universal Fiber [Corning US 20150333829 A1]. In addition, a hybrid SM-MMF that combine in some way the features of SMF and MMF, such as designs with double cores to have operation as MMF, where the smallest center core is designed to operate with SM transceivers as described in U.S. Pat. No. 9,563,012.

However, those approaches require modification of the MMF core which impact on its performance. MMF used in VCSEL-MMF channels have a refractive index design, denominated alpha refractive index profile, which is very sensitive to changes on the geometry or concentration of the dopants. Therefore, a new fiber such as the proposed in prior art, can neither match the performance of high bandwidth MMF nor the performance of SMF. A decision to install a new fiber not optimized for SM or MM transmission, to enable SM transmission cannot be economically supported since it is significantly more efficient to install SMF directly.

A better approach is to use an external device that can operate with installed base MMF. This device will enable better coupling between the fundamental modes of the SMF and MMF. For example, the use of adiabatic couplers such the ones described in U.S. Pat. No. 7,606,452-2009, U.S. Pat. No. 7,184,623 Avanex (currently Oclaro) or U.S. Pat. No. 4,763,976-(1988) Corning-Connector.

Yet another approach is to use lenses to minimize the mismatch of the SMF to MMF modes. For example, in U.S. Pat. No. 8,218,928 GRIN lenses with pin elements are used. Other approaches with lenses are shown in U.S. Pat. No. 6,655,850-2003 (Corning Hybrid fiber expanded beam connector) or in paper Photonics Society Summer Topical Meeting Series, 2013 IEEE, pp. 256-257: Converting a Multimode Fiber into a Single-Mode Fiber.

A more practical approach is to use a SMF path cord with large core area such as fiber U.S. Pat. No. 6,185,346 (2001) and U.S. Pat. No. 6,487,338 (2002). However, it is difficult to make a large core diameter fiber while maintaining the single mode condition. The inventors of this application verified that even SMF designed for long haul applications do not have a core diameter large enough to optimize the coupling SMF-MMF fundamental mode.

A more recent approach is to use phase mask to modify the mode profile of the SM transmitter or SMF, to optimize the coupling with the MMF as shown in http://www.cailabs.com/.

In the next section of this application we disclose novel embodiments that provide optimum coupling between SM mode to MMF fundamental mode while overcoming cost, portability, or complexity limitations attributed to some disclosed prior art mentioned above.

SUMMARY

A patch cord for transmitting between a single mode fiber (SMF) and a multi-mode fiber (MMFs) has a MMF, SMF, and a photonic crystal fiber (PCF) with a hollow core placed between the SMF and MMF. A mode field diameter (MFD) of the PCF hollow core section is in the range of 16 to 19 microns, the length of the PCF is between 1 cm to 10 cm, the MMF has 50±2 microns core diameter, the SMF has a 6-9 microns core diameter, and the coupling between the PCF mode to the MMF fundamental mode is maximized.

DETAILED DESCRIPTION

An apparatus in the form of a fiber optic patch cord that optimize the excitation of the fundamental mode of a laser optimized multimode mode fiber (MMF) from a single mode fiber, or a single mode transceiver, is disclosed. The apparatus enables efficient coupling of SMF mode to MMF fundamental mode and MMF fundamental mode to SMF mode.

The apparatus was designed using fiber modeling, imaging, and temporal signal processing. The fiber modeled is MMF with refractive index often referred to as the α-profile.

The refractive index profile of these MMFs inside the core is described by a function given by, $$n = n_1 \sqrt{1 - 2\Delta\left(\frac{r}{a}\right)^\alpha} \quad (1)$$

where $\Delta \approx (n_1-n_2)/n_1$, $n_1$ is the refractive index on the axis of the fiber, $n_2$ is the refractive index in the cladding, r is the radial position inside the fiber core, a is the core diameter, and $\alpha$ is the exponent parameter which takes a value of ~2 for fibers designed to support operation near 850 nm.

From theory described in [2], a simplified expression for the relative mode group delay, $t_g$, can be derived from (1) as a function of the wavelength and the α-profile parameters as shown, $$t_g(\lambda) = \frac{N_1(\lambda)}{c}\left[\Delta\left(\frac{\alpha - \alpha_{opt}(\lambda)}{\alpha + 2}\right) \cdot \left(\frac{v_g}{v_T}\right)^{\alpha/(\alpha+2)} + \ldots\right] \quad (2)$$

where c is the speed of light in the vacuum, g is the mode group (MG) index, (a mode group comprises those modes that have nearly equal propagation constants), $v_g$ is the number of modes inside the MG, which have a propagation constant larger than $\beta_g(v)$, $v_T$ is the total number of modes, $N_1$ is the group refractive index of the core material at r=0 and, $\lambda$ is the optical source wavelength.

The optimum alpha value that minimize group delay at a single operational wavelength $\lambda$ and y the profile dispersion parameter is given by, $$\alpha_{opt}(\lambda) = 2 + y(\lambda) - \Delta\frac{(4 + y(\lambda))(3 + y(\lambda))}{5 + 2y(\lambda)} \quad (3)$$

where, $$y(\lambda) = -\frac{2n_1}{N_1}\frac{\lambda}{\Delta}\frac{d\Delta}{d\lambda} \quad (4)$$

Figure 1:
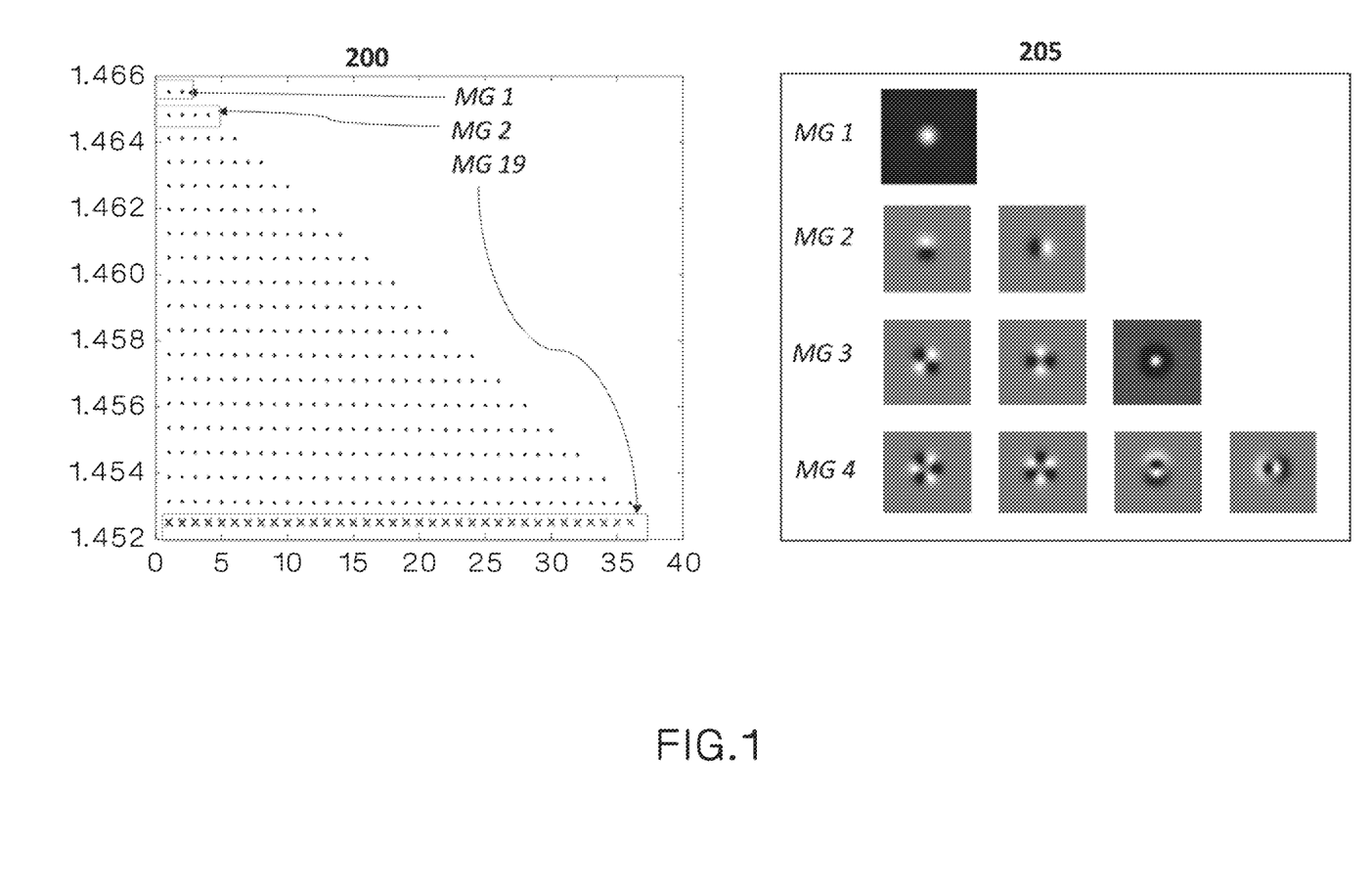
FIG. 1 shows temporal and spatial parameters of modes for a first modeled MMF.
Figure 2:
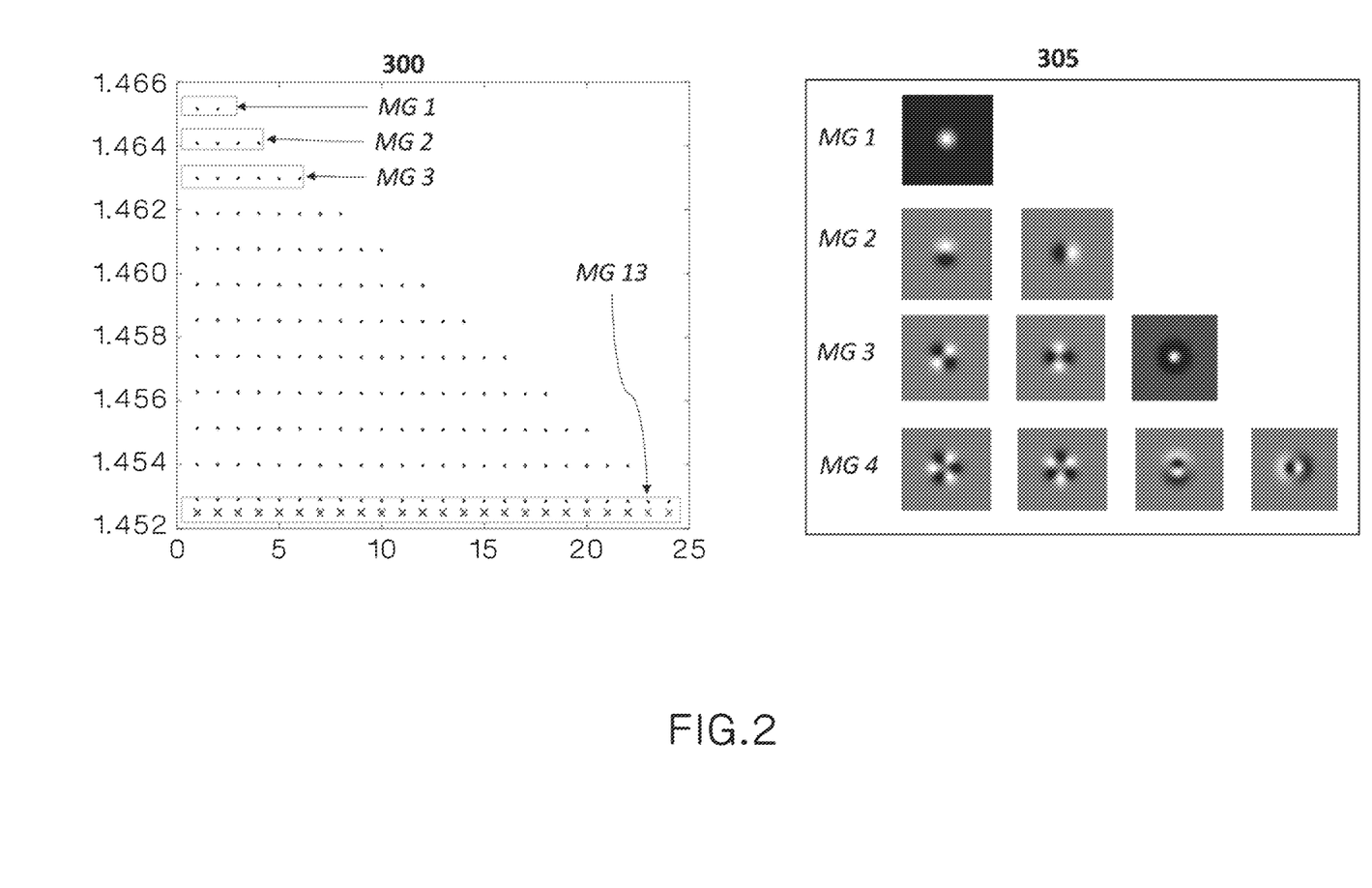
FIG. 2 shows temporal and spatial parameters for a second modeled MMF.
Figure 3:
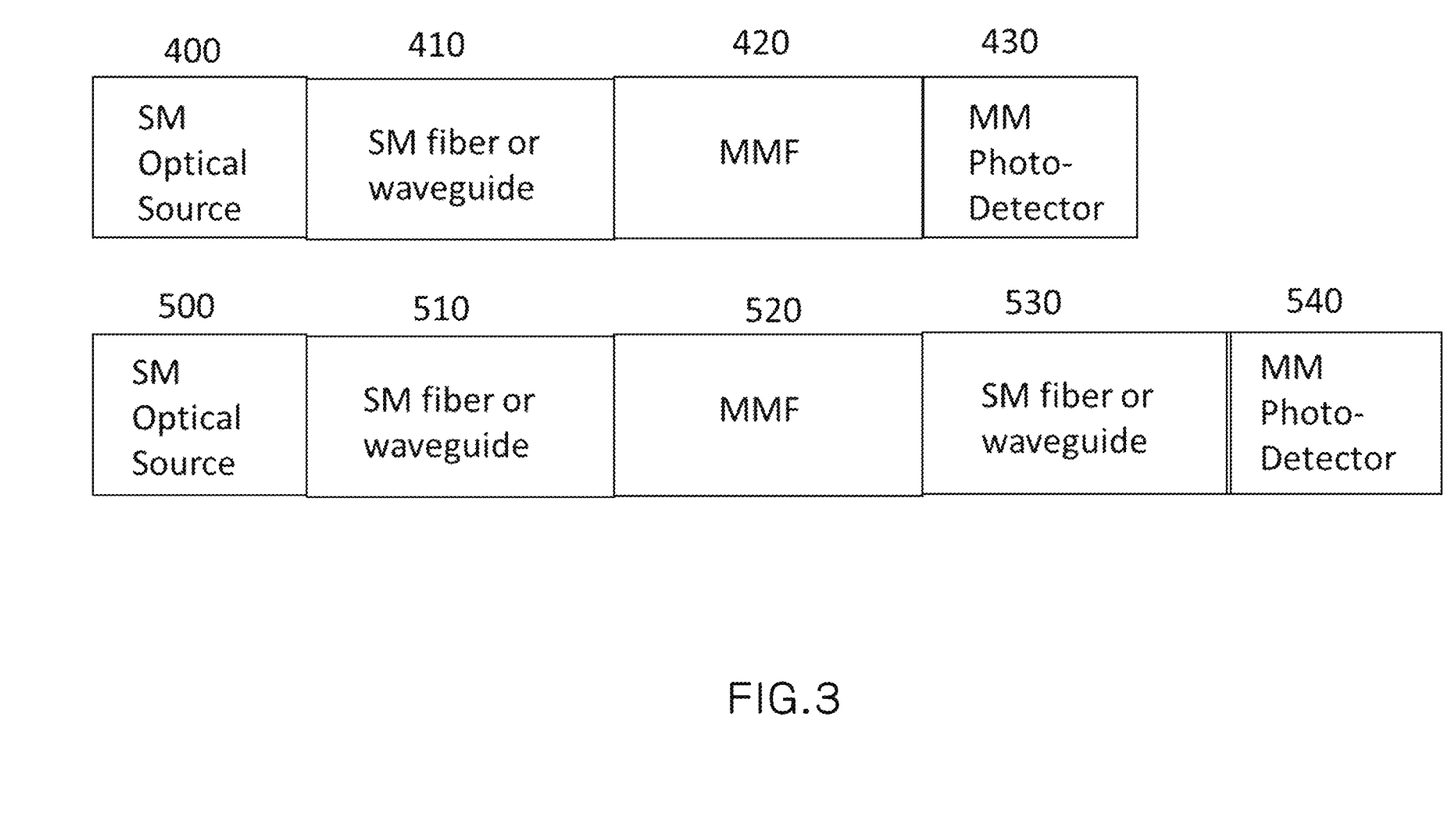
FIG. 3 shows a schematic illustrating the design method of the coupler.

Using (3) and $\lambda$=850 nm the α-profile that optimize transmission at the 850 nm window can be obtained. Around 850 nm there are around 380 modes grouped in 19 mode groups (MGs) are obtained. At 1300 nm, the same fiber can have less than 160 modes distributed in 12 or 13 mode groups. In FIG. 1, 200 shows the propagation constant of the 19 MGs for an α-profile at 850 nm. In 205, the normalized field amplitude profiles, $\psi_{G,i}(r,\phi)$, for the first MGs (one polarization) is shown. For the same fiber, in FIG. 3, 300 shows the propagation constant of 13 MGs at 1300 nm. The mode profiles for the modes (one polarization) inside a MG are shown in 305.

Design Method

The coupling ratios resultant from a SMF launch into a MMF can be obtained from the overlap integral of the MMF normalized field amplitude patterns, $\psi_{G,i}(r,\phi)$ and at the field amplitude patterns of a SMF with core radius, R, as shown below, $$O(R, \Delta x, \Delta y)_{G,i} = \int_y \int_x \psi_{G,i}(x, y)\vartheta(R, x - \Delta x, y - \Delta y)dxdy \quad (5)$$

where i is the index of the modes that are included in the mode group, MG=G, $\Delta x$ and $\Delta y$ represent misalignments of the SMF fiber with respect to the MMF and $\vartheta$ (R, x, y) is the normalized fundamental field pattern of a SMF of radius R.

The value of the total coupled power from the SMF with core radius $R_{Tx}$, to each mode group is given by, $$P_G(R, \Delta x, \Delta y) = \sum_i |O_{G,i}(R_{Tx}, \Delta x, \Delta y)|^2 \qquad (6)$$

where the power of all the modes inside the MG=G are added. The value of $P_G$ ranges from 1 for maximum efficiency coupling to 0 no coupling. To compute the signal after the detector we assume a SMF or $R_{Rx}$ core radius placed between the MMF and the detector. The power coupled to the detector given, $$P_G(R_{Tx}, R_{Rx}, , \Delta x_{Tx}, \Delta y_{Tx}, \Delta x_{Rx}, \Delta y_{Rx}) = \qquad (7)$$
$$\sum_i |O_{G,i}(R_{Tx}, \Delta x_{Tx}, \Delta y_{Tx}) O_{G,i}(R_{Rx}, \Delta x_{Rx}, \Delta y_{Rx})|^2$$

The objective now is to find the optimum radius of the SMF that maximize the $P_G$ for G=1, which represents the fundamental mode of the MMF, while minimizing $P_G$ for the sum of all other Gs different than one.

The optimizing metric to find optimum $R_{Tx}$ or $R_{Rx}$ is estimate the power in the fundamental divided by the power in the other modes as shown below.

$$m(R_{Tx}, R_{Rx}, \Delta x_{Tx}, \Delta y_{Tx}, \Delta x_{Rx}, \Delta y_{Rx}) = \qquad (8)$$
$$\left( \frac{P_G(R_{Tx}, R_{Rx}, \Delta x_{Tx}, \Delta y_{Tx}, \Delta x_{Rx}, \Delta y_{Rx})}{\sum_{G \neq 1} P_G(R_{Tx}, R_{Rx}, \Delta x_{Tx}, \Delta y_{Tx}, \Delta x_{Rx}, \Delta y_{Rx})} \right)$$

Considerations for a known range of mechanical tolerances can simplify (8) as follows, $$M(R_{Tx}, R_{Rx}) = \min_{f(\Delta x_{Tx}, \Delta y_{Tx}, \Delta x_{Rx}, \Delta y_{Rx})} m(R_{Tx}, R_{Rx}, \Delta x_{Tx}, \Delta y_{Tx}, \Delta x_{Rx}, \Delta y_{Rx}) \qquad (9)$$

where, $f(\Delta x_{Tx}, \Delta y_{Tx}, \Delta x_{Rx}, \Delta y_{Rx})$ represent the tolerance space for fiber misalignment during the fabrication of this device. For each $R_{Tx}$, $R_{Rx}$ the minimum value in the tolerance space represents the worst case operation for that combination $R_{Tx}$, $R_{Rx}$ as shown in the following example. FIG. 3 shows a schematic to illustrate the design method. In 400 it is shown a SM source connected to a SM fiber or waveguide, 410. This fiber or waveguide is connected to a 50 micron MMF, 420. The other side of that fiber is connected to a large aperture photodetector, 430, (≥50 microns).

In 500, it is shown a SM source connected to a SMF fiber or waveguide, 510. This fiber or waveguide is connected to a 50 micron MMF, 520. The other side of that fiber is connected to another SMF or waveguide, 530. The SMF or waveguide is connected to a SM photodetector, 540.

Figure 4:
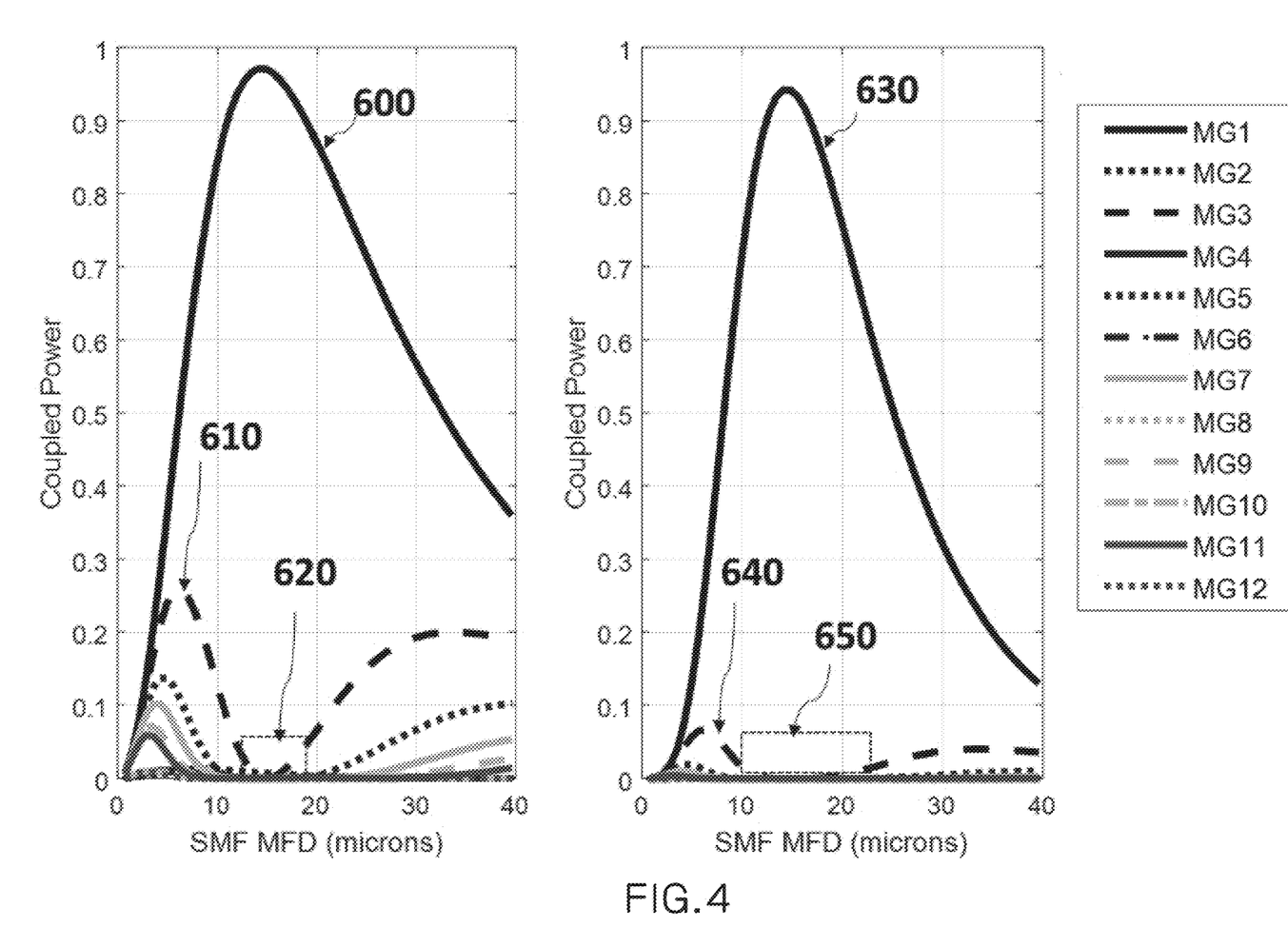
FIG. 4 shows the coupling parameters for the configurations shown in FIG. 3.

In FIG. 4, the coupling parameters shown in equations (5-8) are computed for both configurations shown in FIG. 3.

The figures show the coupling power in the vertical axis vs the launch fiber mode field diameter. In this figure, we assume that there is not misalignment between the SMF to the MMF or from the MMF to the detector. Traces 600 to 620 are related to the configuration that use a MM photo-detector shown in the configuration 400-410-420-430 shown in FIG. 3. Trace 600 denote the coupling of the SMF to the fundamental mode of the MMF. Trace, 610 represents the coupling to MG3 and 620 represent the region coupling that maximize the ratio of the power in the fundamental mode while minimizing the power in the other modes when there is perfect alignment and when a multimode photo-detector is used.

Results for the configuration shown in FIG. 4 500-510-520-530-540 are shown in traces 630 to 650. Here 510 and 530 have identical MFD which match the single mode photo-detector diameter. In this case we observe that the power coupled to the MG1, 630, is slightly reduced due to addition of the receiver fiber, 530. However, there is a higher reduction for the power coupled to other modes, that produce distortion or noise at the receiver. The region denoted by 650 indicates the optimum MFD for both 510 and 530. This region is relatively wide (10 microns to 20 microns) since we are assuming a perfect alignment.

Figure 5:
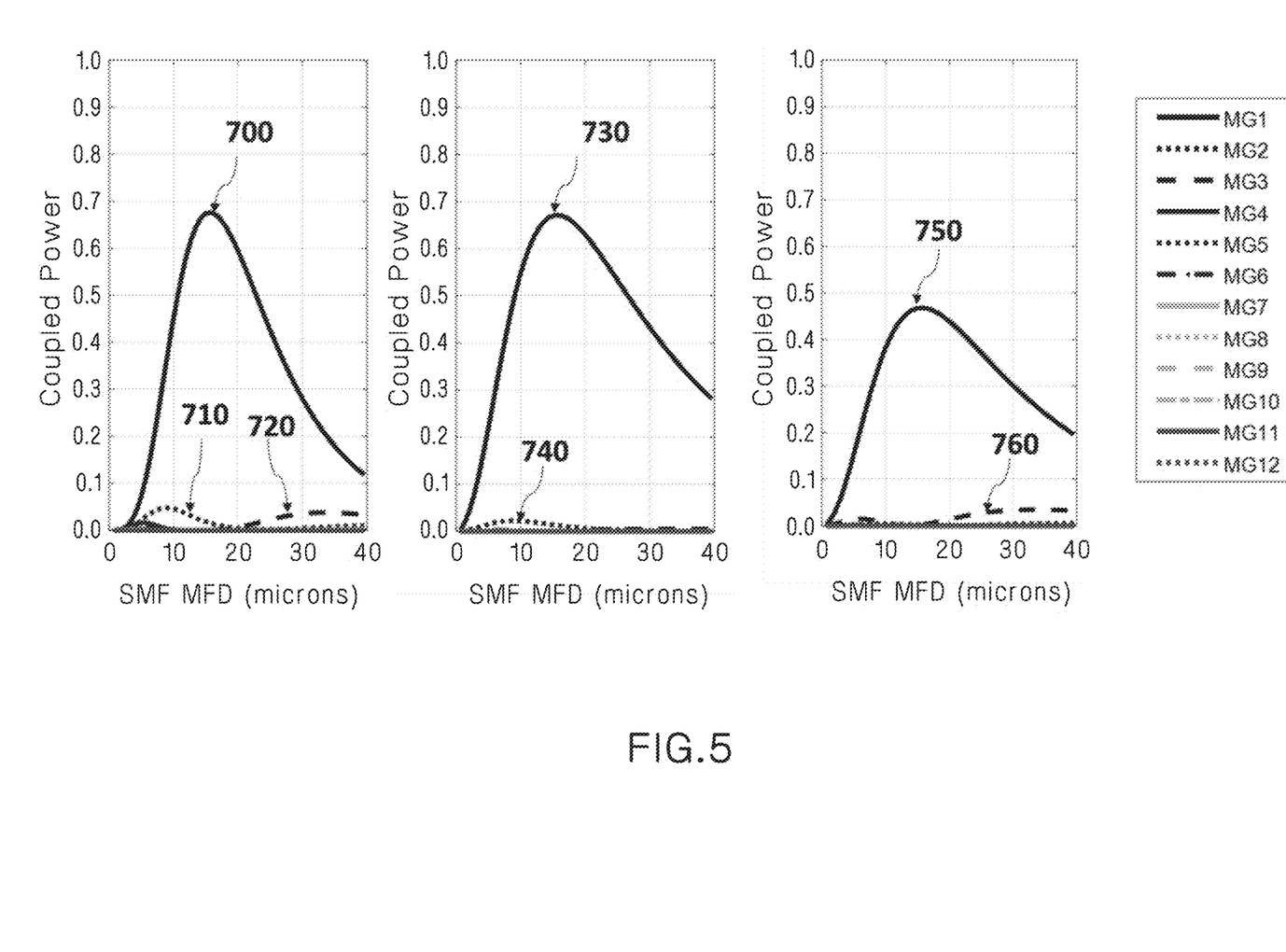
FIG. 5 shows the coupling parameters with a ±3 micron offset.

FIG. 5 shows results for more realistic tolerances such as +/−3 microns and when different MFDs for 510 and 530 are used. For traces 700 to 720, we assume an offset of 3 microns between 510 and 520 and offset of −3 microns between 520 and 530. It also assumed that the MFDs of 510 and 530 are identical. In this case the power coupled to MG1 reduces while the power in MG2 and MG3 increases. The power in MG3 can be reduced by setting the MFD of the receiving fiber, 530 to 12 microns as shown in traces 730 and 740. On the other hand, increasing the MFD of the fundamental mode of 530 to 20 microns reduces the power coupled to MG 1, see trace 750, and increases the power in MG2 as shown in trace 760.

Numerical simulation using the methods described above and the tolerance range reduction restrict the optimum region to 16 to 19 microns.

It should be noted that the disclosed method does not include the mode coupling caused by the connectors of the channel. Those effects were evaluated experimentally and are described in the next section.

The calculation methods described in previous section indicates that MFD between 16 to 19 microns are needed to enable operation of SMF transceivers over a MMF of 50 micron diameter. The inventors realized that the required MFD values cannot be achieved by standard commercially available fibers. Also, that it is difficult to increase the MFD in standard fibers without increasing the number of modes or without a high reduction of numerical aperture (NA). Lower NA can increase the coupling and losses between the laser and the fiber. In this application we propose to use a small section of a specific type of photonic crystal fibers to provide the large MFD without increasing the number of propagating modes in the MMF.

Figure 6A:
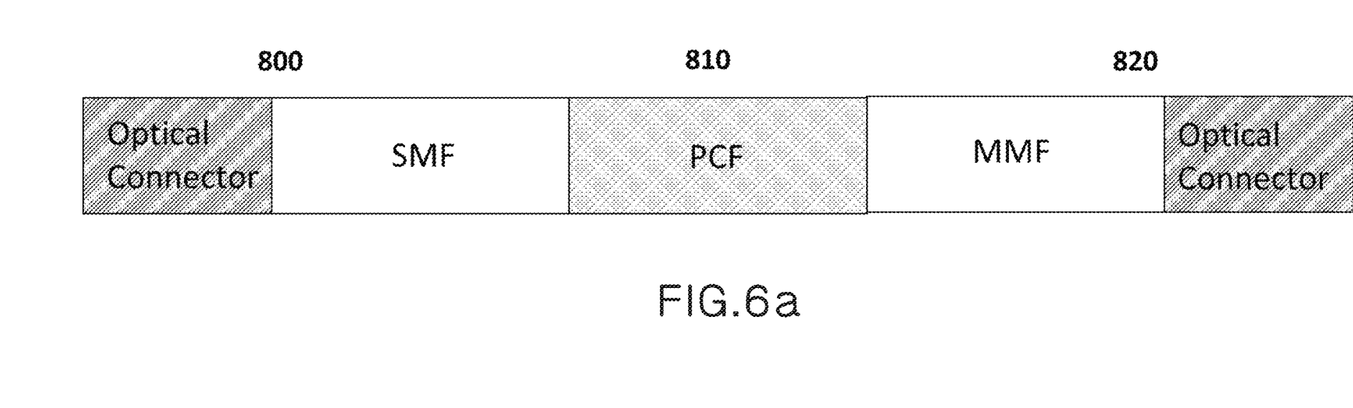
FIGS. 6a and 6b show an assembly schematic for a duplex channel SMF to MMF patch cord.
Figure 6B:
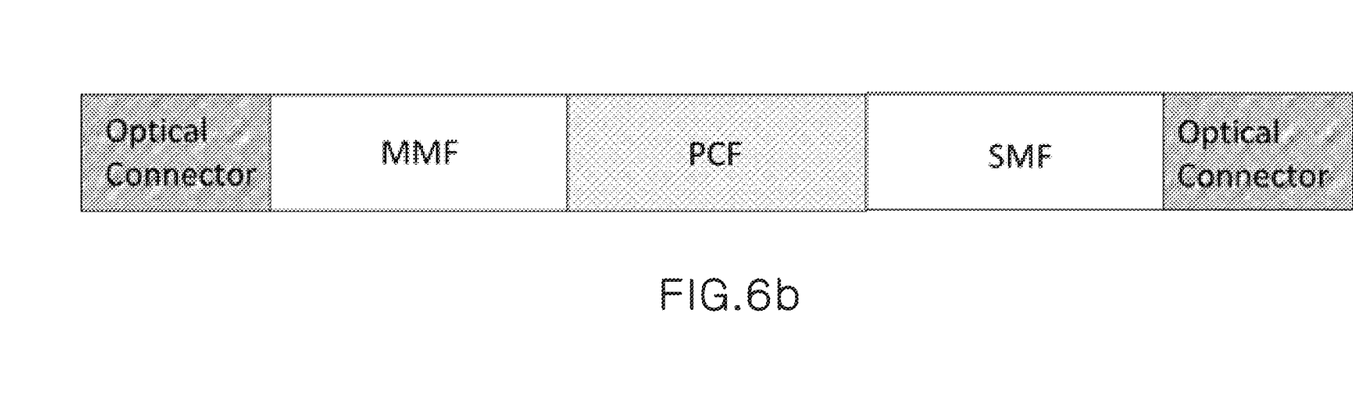

FIG. 6(a) shows a patch cord apparatus that use photonic crystal fiber as an adaptor from SMF to the fundamental mode of MMF. A SMF pigtail, shown in 800, is spliced to the PCF, 810. The splice may have a taper in the coupling section of the SMF pigtail to minimize the losses. The other end of the PCF is spliced to a MMF pigtail, 820. The connectors of both fiber pigtails can be LC, SC, FC, or no connector. Alternatively, for some applications a multiplexer at the transmitter side and a demultiplexer at the receiver side can be used. FIG. 6(b) shows a patch cord apparatus that use photonic crystal fiber as an adaptor from the fundamental mode of MMF to SMF. IN one embodiment, the PCF can have a hollow core.

Figure 7A:
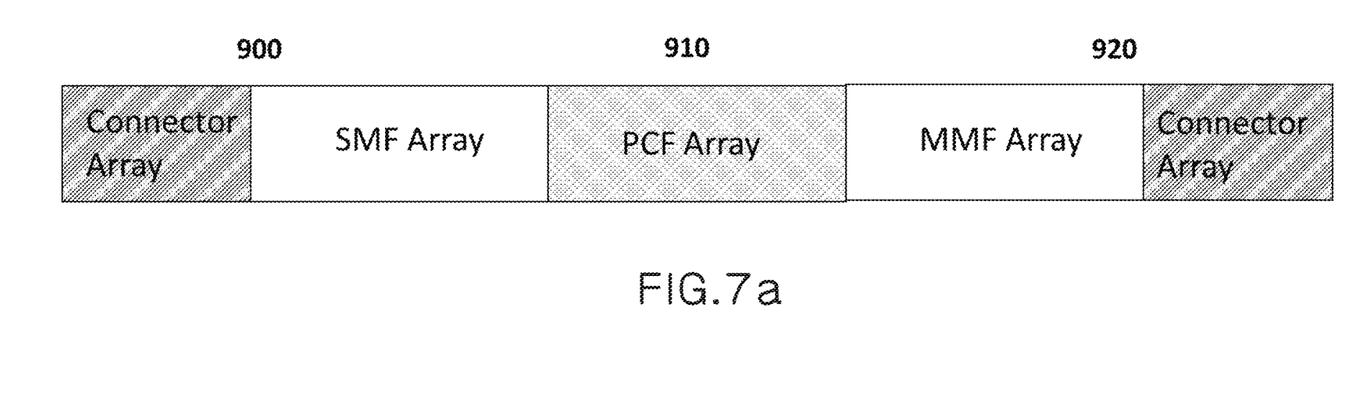
FIGS. 7a and 7b show an assembly schematic for a parallel channel SMF to MMF patch cord.
Figure 7B:
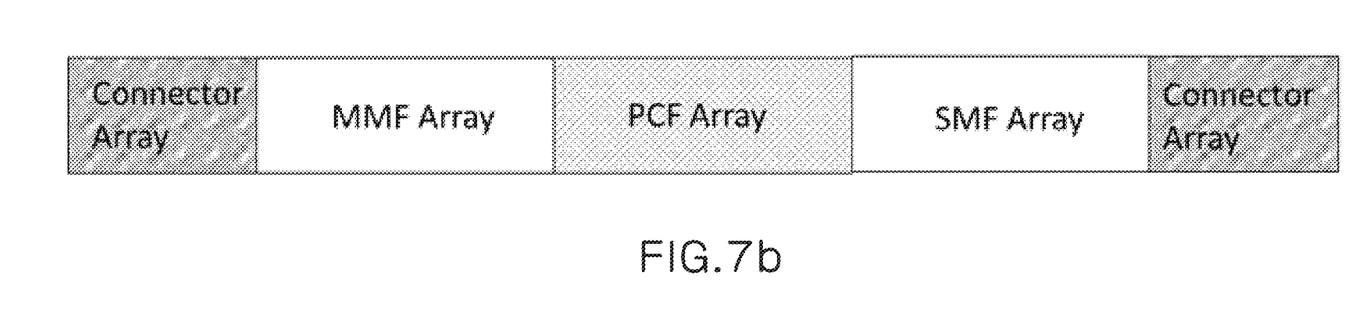

Alternatively, FIG. 7(a) shows a patch cord including an array of fibers, i.e., 12 fibers, to work as adaptors from SMF array to the fundamental mode of MMF array. In 900 we have an SMF fiber array with one end terminated using for example MPO/MPT connectors. On the other end, each fiber of the array is spliced to PCF fibers, 920. The PCF fibers are spliced to one end of a MMF array. The MMF is terminated using individual LC, SC connector or an MPO/MPT connector. FIG. 7(*b*) shows a patch cord to work as adaptors from the fundamental mode of MMF array to SMF array.

Figure 8:
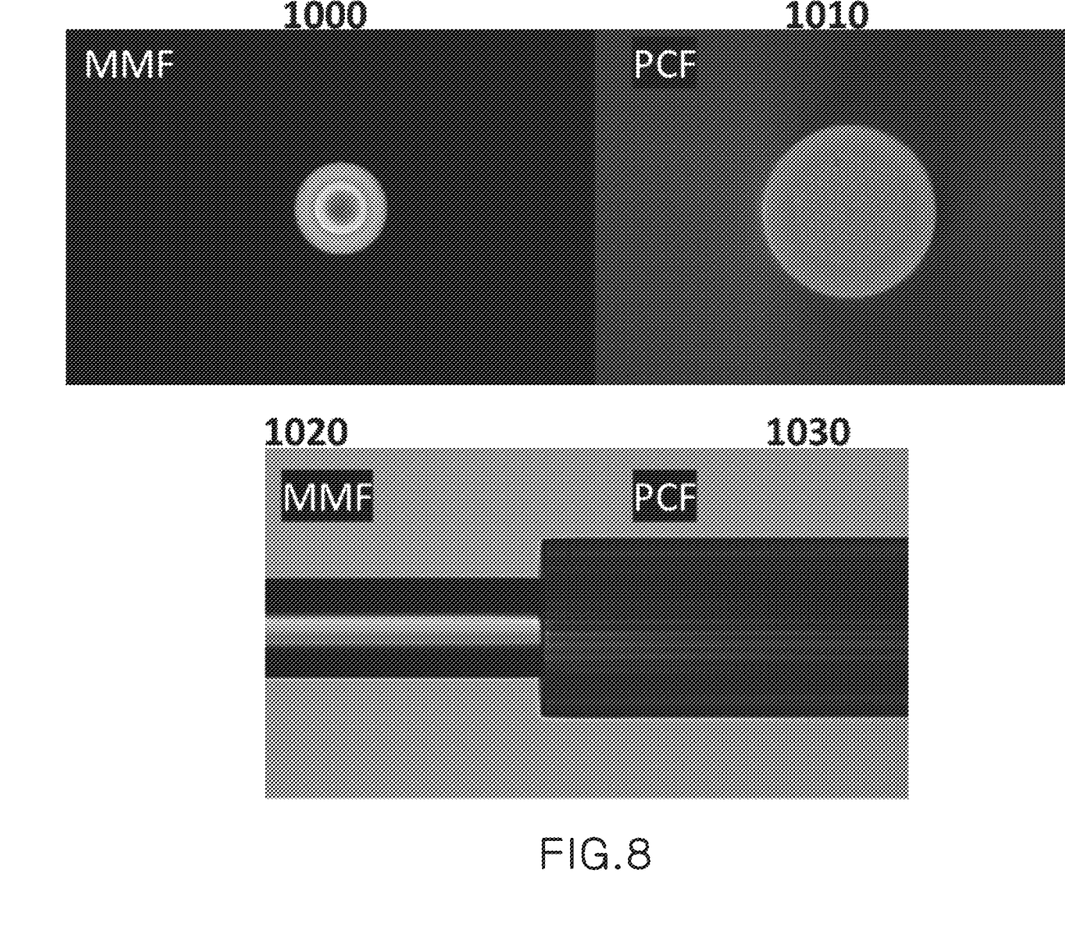
FIG. 8 shows the dissimilar geometry and dimensions of the MMF and PCF to be spliced.

A critical part for the fabrication method is the control of misalignment during splicing. FIG. 8 shows the dissimilar geometry and dimensions of the MMF and PCF to be spliced. The end face of a MMF, 1000, and a PCF, 1010, of 20 microns hollow core are inspected. A lateral view of the fibers before splicing in shown in 1020 and 1030. Due to the large differences in outer diameter and structure of the fibers, an active alignment is required. The active alignment used and proposed require the evaluation of mode intensity patterns, mentioned in previous section, to find the optimum alignment that maximize the overlap integral of the theoretical fundamental modes of the fiber while minimizing the power in other modes as shown in equations 5-6. Alternatively, we also use an oscilloscope of high bandwidth to measure the time delays while the alignment is performed.

Figure 9:
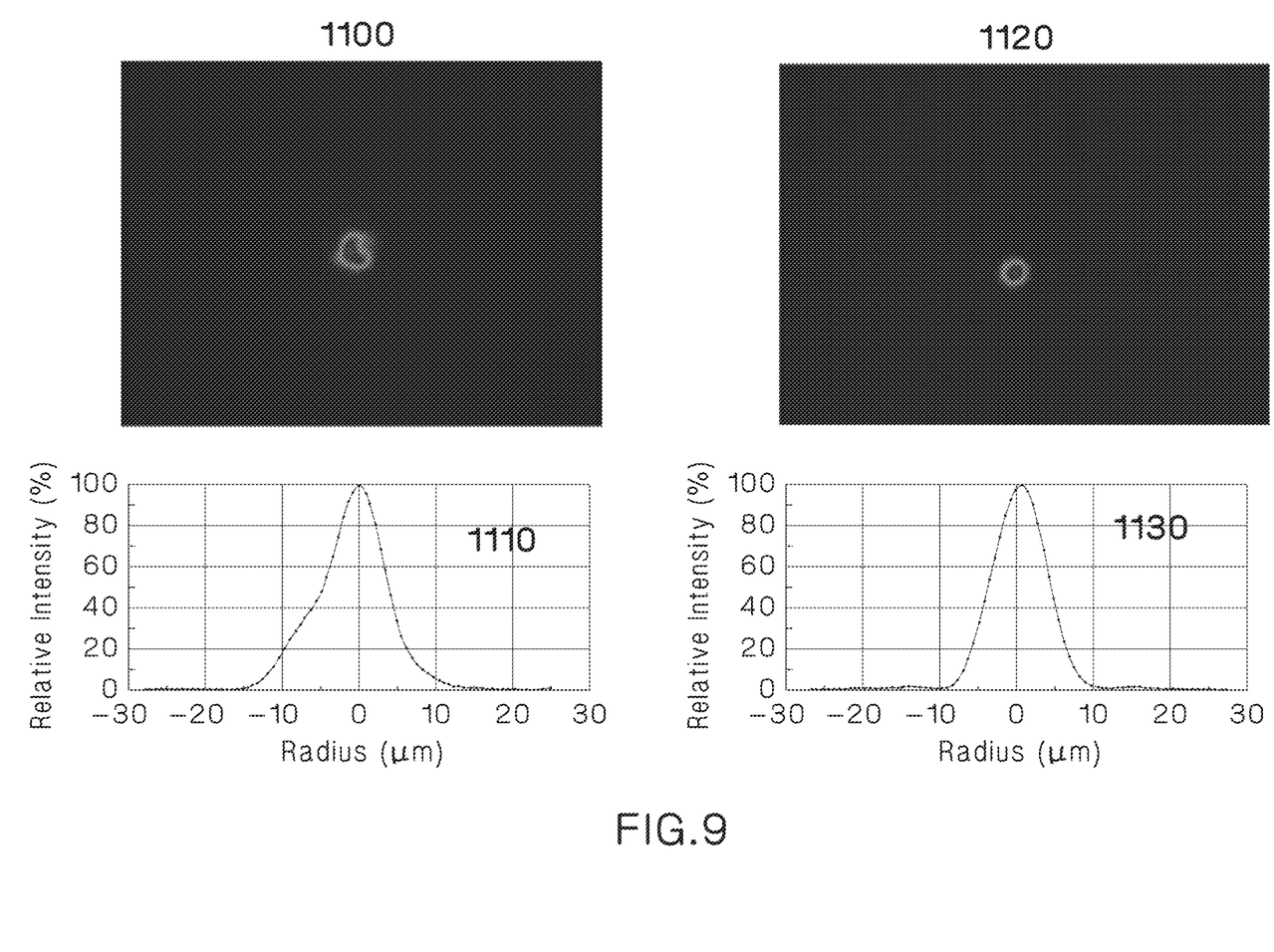
FIG. 9 shows the intensity pattern and resultant profile of direct light coupling from an SMF to an MMF and vice versa.

To test the properties of the disclosed patch cord we compare the intensity profiles of light launched to a MMF with and without the described apparatus of SMF to the fundamental mode of MMF adaptor as shown in FIG. 9. A SM transceiver launching light directly to a MMF produce an intensity pattern shown in 1100, the intensity profile is wide and asymmetric as shown in 1110. Estimation of the modes from the disclosed method indicates significant power in MG3 among others. The coupling of the light from a SM transceiver to the MMF when the patch cord apparatus excites mainly MG1, producing a narrower and symmetric intensity pattern, 1120, and the intensity profile 1130.

The performance differences between MMF channel using direct launch from a SMF and using the disclosed apparatus were measured. Several channel configurations were evaluated. Part of the channel was subject to a small amount of motion using a fiber shaker. This simulates movement of the patch cord in the data center that can produce modal noise.

Figure 10:
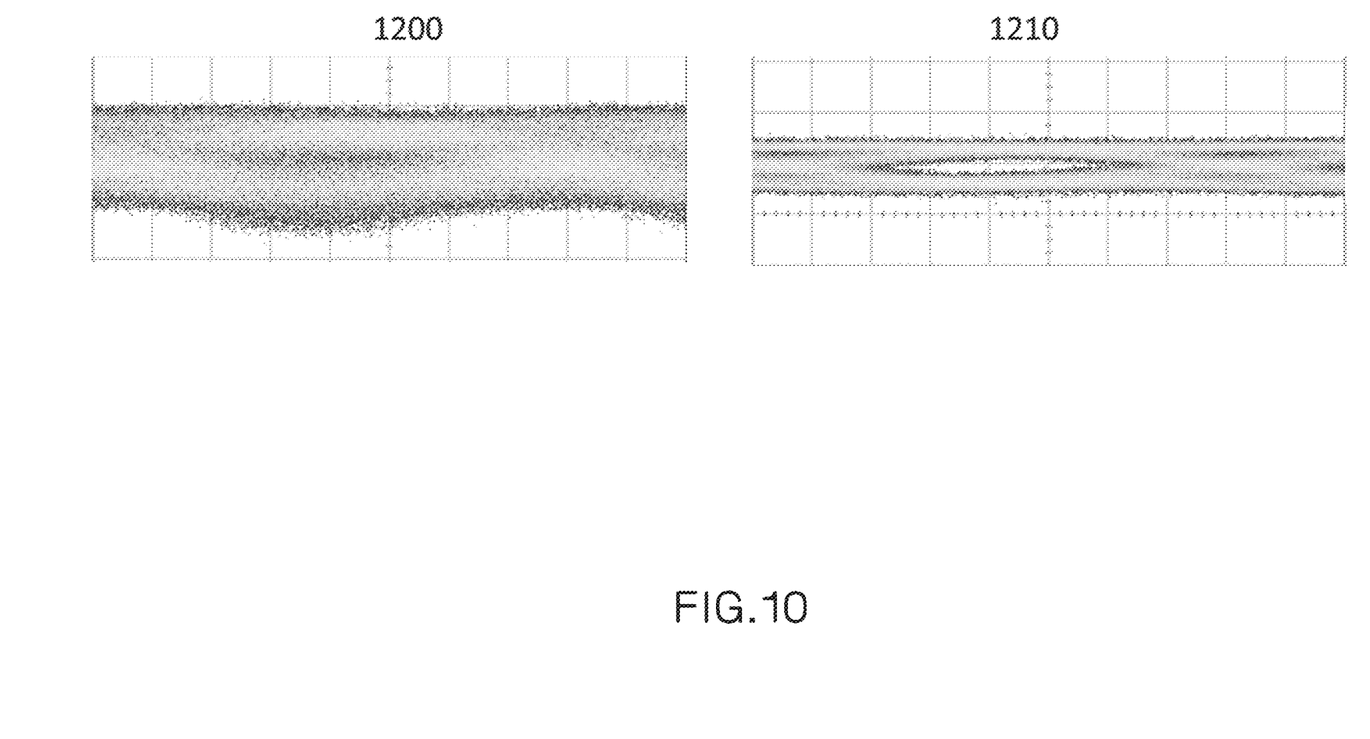
FIG. 10 shows an eye diagram obtained from direct SMF to MMF coupling after propagation over 200 meters on MMF channel with six connectors.

There were always performance advantage using the disclosed apparatus. FIG. 10 shows an example for the typical difference in eye diagrams of a 25 Gb/s transmission at 1300 nm, over a 200 meter MMF channel using 6 connectors. In 1200, we see the eye diagram of the signal before the receiver when the transceiver is coupled directly to the MMF. In 1210, the disclosed patch cord was utilized only at the transmitter side. This figure shows that the signal without using the device is slightly stronger since it does not have the additional losses of the patch cord (around 4 dB).

However, the eye diagram resultant of the propagation over the channel with six connectors is nearly close, due to modal noise. On the other hand, the channels using the disclosed patch cord shows smaller signals amplitude (due to the patch cord attenuation) but with improved eye opening. The disclosed patch cord helped to reduce modal noise penalties by optimizing the coupling to the MG.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

What is claimed is:

1. A method of splicing a coupler between fibers, the method comprising:
   providing a multi-mode fiber (MMF) configured to include a first core diameter;
   providing a single mode fiber (SMF) configured to include a second core diameter, the second core diameter being less than the first core diameter;
   providing a photonic crystal fiber (PCF) coupler with a hollow core, the PCF coupler configured to include a mode field diameter (MFD) in a range of 16 to 19 microns which is a diameter size between the first core diameter and the second core diameter; and
   splicing the PCF coupler between the SMF and the MMF;
   wherein a splice coupling between the PCF coupler and the SMF is tapered to avoid signal losses at a transition between the PCF coupler and the SMF;
   wherein a splice coupling between the PCF coupler and the MMF is actively aligned to minimize misalignment at a transition between the PCF coupler and the MMF;
   wherein the splice coupling between the PCF coupler and the MMF is actively aligned by maximizing an overlap integral of a fundamental mode of the PCF coupler with a fundamental mode of the MMF while also minimizing power transmissions in non-fundamental modes within the MMF.

2. The method of claim 1, wherein the splice coupling between the PCF coupler and the MMF is actively aligned by further using an oscilloscope of high bandwidth to measure time delays while an alignment between the PCF coupler and the MMF is being performed.

3. The method of claim 1, further comprising:
   actively aligning the splice coupling between the PCF coupler and the SMF to minimize misalignment at the transition between the PCF coupler and the SMF.

4. The method of claim 1, wherein signal operational wavelengths are in a 1300±50 nm spectral window.

5. The method of claim 1, wherein signal operational wavelengths are in a 1500±100 nm spectral window.

6. The method of claim 1, wherein a MMF core diameter is in a range of 45 to 63 microns.

\* \* \* \* \*